United States Patent [19]

Kuhnle

[11] 4,249,624
[45] Feb. 10, 1981

[54] BENDING FORCE RECEIVER

[75] Inventor: Ernst Kuhnle, Balingen, Fed. Rep. of Germany

[73] Assignee: Bizerba-Werke Wilhelm Kraut KG, Balingen, Fed. Rep. of Germany

[21] Appl. No.: 65,844

[22] Filed: Aug. 13, 1979

[30] Foreign Application Priority Data

Aug. 17, 1978 [DE] Fed. Rep. of Germany ....... 2836011

[51] Int. Cl.³ .................... G01G 3/14; G01G 21/28
[52] U.S. Cl. .................... 177/211; 73/141 A; 177/229; 177/238
[58] Field of Search ............. 177/211, 229, 225, 179, 177/180, DIG. 9, 238; 73/141 A

[56] References Cited

U.S. PATENT DOCUMENTS

| 2,597,751 | 5/1952 | Ruge | 177/211 X |
| 3,667,560 | 6/1972 | Cooke | 177/211 |
| 3,970,982 | 7/1976 | Kurtz | 73/141 A X |

*Primary Examiner*—Joseph W. Hartary
*Attorney, Agent, or Firm*—Laubscher & Laubscher

[57] ABSTRACT

A bending force receiver has a bending rod which is supported in a main bearing and has a force introduction location. Strain gauges are mounted on the bending rod in a region between the main bearing and restraining means limiting axial movement of the bending rod due to an applied force. This region is enclosed by a casing. The bending rod projects from the casing at the main bearing in the form of an elastically bendable cantilever arm including the force introduction location. The free end of the cantilever arm co-operates with an overload abutment.

9 Claims, 6 Drawing Figures

BENDING FORCE RECEIVER

The invention relates to a bending force receiver with overload protection, in particular for balances, in which a bending rod which is supported in a main bearing and is provided with a force introduction location, supports strain gauge strips and the strain gauge strips are protected by a cover against influences of the environment.

In known and commercially available bending force receivers of this kind the strain gauge strips are adhesively secured on the bending rod and deliver an electrical voltage signal when the bending rod is slightly deformed ("bent") by the introduction of an external force.

Bending rods of this kind are extremely sensitive in respect of mechanical damage, moisture, in particular water vapour of the atmosphere. Even the smallest changes in the adhesive owing to the absorption of moisture or mechanical influences effect a change of the ratio mechanical tension/electrical signal, that is to say a change of the basic adjustment of the bending force receiver. An even more disadvantageous effect on the fundamental or basic adjustment of the system in the effect of absorption of moisture on the insulation resistance of the strain gauge strips.

When a bending force receiver is used in a balance capable of calibration, a high accuracy and satisfactory consistancy of the measuring values is demanded and in addition thereto the possibility to employ the balance under unfavourable environmental conditions. Thereby the problem of a protection of the bending force receiver against external influences acquires a great importance.

Two solutions of this problem have become known heretofore:

In the so-called "open system" the adhesively attached strain gauge strips and the electrical connections thereof are covered by a synthetic permanently elastic mass. The tighter this cover is, the safer is the protection against water vapour and moisture, but the greater is the reacting mechanical influence on the elastic properties of the bending rod; this has a negative effect during long term loads in the form of "creep", during normal weighing up and down as "hysteresis", and at different temperatures as a "temperature error". Furthermore, if it is assumed that the necessary minimum covering of each strain gauge strip must always have the same thickness and the bending rods must be constructed more elastic (that is thinner) for smaller nominal loads, the damaging reaction of the cover mass on the measuring result at small nominal load becomes finally unacceptably large. For this reason limits are set to the "open system" in respect of small nominal loads, for example smaller than 10 kg.

In the so-called "closed system" the region of the bending rod carrying the strain gauge strips is hermetically sealed against moisture by means of a flexible corrugated bellows of metal or rubber, which is welded or adhesively secured to the bending rod in a water vapour-tight manner. Admittedly such a corrugated bellows provides absolute protection against moisture, but the damaging reaction of the corrugated bellows on the elastic properties of the bending rod becomes relatively large at small nominal loads, so that such corrugated bellows cannot be attached to bending rods which are intended for small nominal loads. Furthermore the risk exists that the elastic properties of a pre-adjusted "bare" bending rod are changed merely by the attachment even of a corrugated bellows, a later adjustment operation being practically hardly possible without removal of the bellows. Moreover, the elastic properties of corrugated bellows are easily altered, e.g. by ageing or by unintentional mechanical damage.

Furthermore, the known bending force receivers with bending rod have the defect in common that they are securely clamped at one end and receive at the free end the force to be measured. Since the strain gauge strips permit only a small deformation and consequently the bending-through of the bending rod also must only be very small, the maximum permissible mobility or "resilient displacement" of the bending rod in the region of its force introduction location lies in the order of magnitude of only approximately 2/10 mm. With such a small measuring path it is difficult to arrange a mechanical overload abutment at this place by which the bending rod is protected against an objectionably high loading. Therefore it is usual to introduce the force to be measured from the outside by way of an additional resilient member with a larger stroke suitable for an overload protection and to associate this resilient member with the overload abutment. However, such an overload protection necessitates an undesirable additional constructional expenditure as well as an increased constructional height.

It is an object of the invention to propose a simply constructed bending force receiver the strain gauge strips of which are completely protected against external influences and which at the same time comprises an overload protection.

According to this invention there is provided a bending force receiver comprising a bending rod which is supported in a main bearing and is provided with a force introduction location, mounted on the bending rod in a region between the main bearing and restraining means limiting axial movement of the rod in response to an applied force, the said region being freely surrounded by a sealing casing, the bending rod extending in the form of an elastically bendable cantilever arm including the force introduction location, projecting from the casing at the main bearing in a sealed manner and co-operating at the free end of the cantilever arm with an overload abutment.

Preferred embodiments of this invention will now be described, by way of example only, reference to drawings in which.

Figure 1:
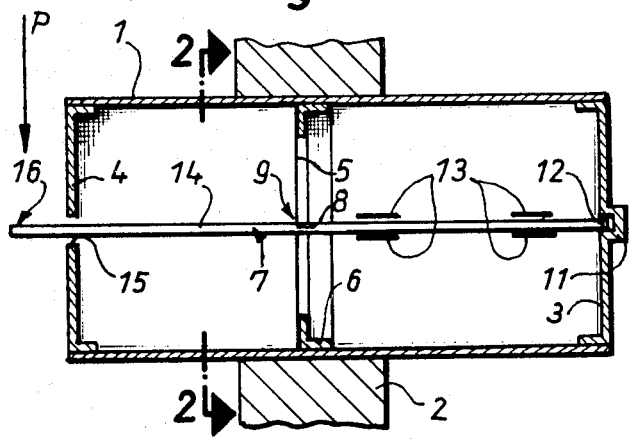
FIG. 1 is a diagrammatic drawing of a bending force receiver according to the invention, in longitudinal section.

In FIG. 1, a tubular casing 1 is securely fixed in a mounting 2, e.g. the frame of a balance. The casing 1 which has a rectangular cross-section in the constructional form illustrated, but which alternatively may have another cross-section, e.g. a circular-cylindrical cross-section, is covered at each of it two ends by shields 3 and 4, respectively, the shield 3, at its edge, being connected in a gas-tight manner to the inner wall of the tube forming the casing 1. The interior of the casing 1 is divided in the region of the mounting 2 into two compartments by a diaphragm 5 constructed e.g. of metal. This diaphragm 5 is connected in a gas and liquid-tight manner to the inside of the tube wall of the casing 1, e.g. by means of an annular flange 6.

A bending rod 7 which is of rectangular cross-section in the constructional form illustrated extends in the longitudinal axis of the casing 1. The bending rod 7 is guided through a corresponding opening 8 in the diaphragm 5 and is tightly connected to the edges of this opening, e.g. by soldering. Therefore the compartment of the casing 1 located on the right in FIG. 1 is completely sealed against external influences. The diaphragm 5 receiving the bending rod 7 forms the main bearing 9 for the bending rod, the latter being securely fixed therein. As illustrated, the shield 3 comprises a bush-like recess 11 by means of which the adjacent free end 12 of the bending rod 7 receives an additional restraint in the manner that although this end may escape axially to a minor extent, it is nevertheless prevented from a lateral, in particular, upwardly directed displacement. The usual strain gauge strips 13 are mounted on the bending rod 7 in the region between the main bearing 9 and the bush 11. In a manner known per se and therefore not illustrated in the diagrammatic drawing according to FIG. 1, the strain gauge strips are connected to connecting cables which are led out of the region of the casing 1 which is limited by the shield 3 and the diaphragm 5, into the open and to an electrical evaluating apparatus.

As illustrated, the bending rod 7 is extended beyond its main bearing 9 (to the left in FIG. 1) in the form of a free-carrying cantilever arm 14 and extends freely through a correspondingly wide opening 15 in the centre of the shield 4. Outside the shield, the cantilever arm 14 is provided with a force introduction location 16 known per se, for example in the form of a knife edge or cup, at which the force P to be measured is introduced in the usual manner. The main bearing 9 formed by the diaphragm 5 receives the bearing counter force of the measuring force P, offering only a small torsion resistance to a bending deformation of the bending rod 7 and ensuring, as to weighing technique, a lever arm formation between the end 12 of the rod 7 restrained by the bush 11, and the force introduction location 16.

The opening 15 is constructed so large that upon loading at the force introduction location 16, the cantilever arm 14 can move freely in the measuring region of the arrangement. If, upon overloading, the maximum permissible bending-through of the cantilever arm 14, and thus the entire bending arm 7, is exceeded, the cantilever arm abuts the edge of the opening 15. Accordingly the edge of this opening operates as an overload abutment. By suitably selecting the cross-section of the elastic bending rod 7 in the region between the main bearing 9 and the force introduction location 16, the desired mobility or resilience of the force introduction location 16 can be selected in any desired manner, without a disadvantageous reation taking place in respect of the elastic properties decisive for the measuring technique of the bending rod, between the main bearing 9 and the additional restraint by the bush 11. As a rule, the cross-section of the cantilever arm 14 is selected smaller than the cross-section of the aforesaid region of the bending rod, so that the force introduction location 16 undergoes a sufficiently large deflection within the nominal load range; the deflection is then limited, in the case of an overload of the system, by the edge of the opening 15 operating as an overload abutment. In any case, with this construction of the bending rod 7, a separate elastic additional device through which the force P is introduced, as well as a separate overload abutment is not required.

Figure 2:
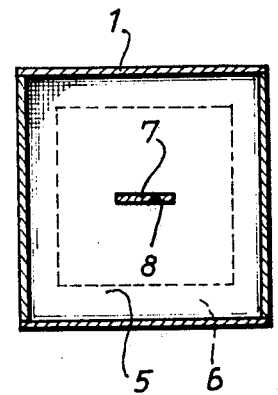
FIG. 2 is a cross-sectional view on the 2—2 in FIG. 1.

With the spacing between the main bearing 9 and the restraint of the bending rod at 11 remaining the same and with the cross-sectional dimensioning of the bending rod 7 in this region remaining the same and with the same mounting of the strain gauge strips 13, the nominal load range may be varied to considerable extent by shortening or lengthening the cantilever arm 14 between the main bearing 9 and the force introduction location 16 (as well as corresponding adjustment of the length of the casing 1 between these points). This is of great advantage from the production point of view. Furthermore, it is also possible, for changing the nominal load range, to provide one or more stationary or displaceable force introduction locations 16 on a cantilever arm 14 of constant length. illustrated in FIGS. 1 and 2 permits clearly the main advantages thereof to be recognised, namely on the one hand the gas and liquid-tight sealing of the region of the bending rod 7 carrying the strain gauge strips 13, and the overload protection formed by the elastically bendable carrier arm abutting the edge of the opening 15. These two advantages are realised side-by-side in the constructional form according to FIGS. 1 and 2. If desired, the cantilever arm 14 may be constructed in a less bendable manner and a conventional overload protection with separate overload abutment, e.g. an overload protection formed by a helical spring, may be associated therewith.

Figure 3:
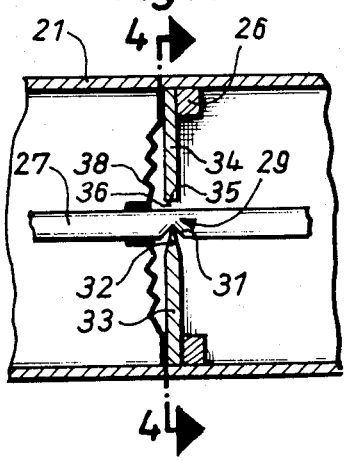
FIG. 3 shows diagrammatically the main bearing of a bending rod, in a different constructional form from FIG. 1.
Figure 4:
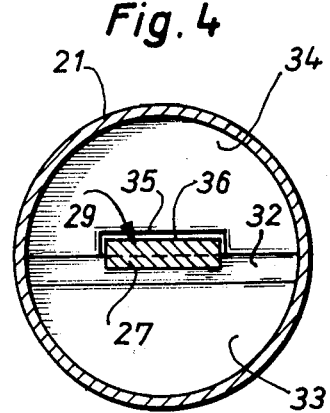
FIG. 4 is a cross-sectional view on the line 4—4 in FIG. 3.

FIGS. 3 and 4 illustrate in a cut-out manner another constructional form of a bending force receiver according to the invention. In this constructional form a knife edge bearing has been substituted for the diaphragm according to FIGS. 1 and 2. For this purpose the bending rod 27 comprises a notch 31 in the region of its main bearing 29, the notch being supported on a knife edge 32. The knife edge 32 is formed at the edge of a component part 33 which, when a tubular casing 21 with a circular cross-section is used, has the configuration of half a circular disc. An upper half circle segment 34, in the assembled state, is supported by its flat lower face on the knife edge 32 (FIG. 4) which projects on the left and on the right of the bending rod 27 and comprises an appropriate opening 35 for the passage therethrough of the rod 27, the opening 35 surrounding the bending rod 27 with a gap 36 of minimum width. The line of contact between the parts 13 and 14 may be sealed with an elastic synthetic resin or the like. A ring 26 serves for connecting the parts 33,34 which are produced e.g. of metal, to the inside of the casing in a gas and moisture-tight manner.

In order that injurious substances, e.g. moisture, cannot penetrate to the strain gauge strips through the gap 36 between the opening 35 and the bending rod 27, a gas-tight flexible corrugated bellows 38, e.g. of metal, is provided in a known manner and is connected to the bending rod 27 in a sealed manner as close to the main bearing 29 as possible. At its peripheral edge the bellows 38 is connected to the parts 33,34 in a sealed manner. The bellows 18 is protected from external damage by the shield 4 which is also provided in the constructional form according to FIGS. 3 and 4 (see FIG. 1). In other respects also, the constructional form according to FIGS. 3 and 4 corresponds to that according to FIGS. 1 and 2.

Figure 5:
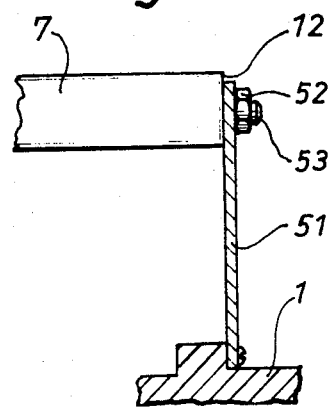
FIG. 5 shows a device for restraining the bending rod.
Figure 6:
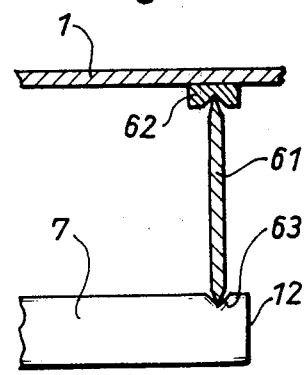
FIG. 6 shows another constructional form of the bending rod.

FIGS. 5 and 6 illustrate particularly preferred embodiments of the additional restraint of the bending rod 7 (or 27) at its free end 12 adjacent the strain gauge strips 13. In FIG. 5 a steel band 51 is fixed at the one end to the lower wall of the casing 1 and at the other end by means of a nut 52 to a screw-threaded projection 53 of the bending rod 7. In this way the bending rod 7 cannot escape upwardly upon loading at the force introduction location 16 at its end 12. In contrast a minor axial displacement is possible.

In the constructional form according to FIG. 6, the steel band 51 has been substituted for by a swing support 61 which is supported by means of knife edges at the one end in a cup 62 on the upper side of the casing 1, and at the other end in a notch 63 in the bending rod 7. In this way also the free end 12 of the bending rod 7 may perform merely a minor axial displacement, but is prevented from moving upwardly.

In place of the restraints illustrated in FIGS. 5 and 6 by means of a steel band 51 and a swing support 61, other elements usual in the manufacture of balances, having cups and knife edges may also be employed which operate in an equivalent manner.

The invention may be realised in numerous configurations. A pressure compensation may be provided in a manner known per se, e.g. by means of a valve, at the sealed compartment of the casing 1 receiving the strain gauge strips 13. The material and the cross-sectional form of the bending rod 7,27 and the casing 1,21 may be selected in an optimum manner dependently upon the respective case of use. The total dimensioning of the force receiver depends merely upon the nominal load to be handled.

I claim:

1. A bending force receiver comprising a bending rod which is supported in a main bearing and is provided with a force introduction location, restraining means limiting axial movement of the rod in response to an applied force, strain gauges mounted on the bending rod in a region between the main bearing and said restraining means, and a sealing casing which freely surrounds the said region of the bending rod, the bending rod extending in the form of an elastically bendable cantilever arm including the force introduction location, projecting from the casing at the main bearing in a sealed manner and co-operating at the free end of the cantilever arm with an overload abutment.

2. A bending force receiver as claimed in claim 1, wherein the casing freely surrounds also the cantilever arm as far as short of the force introduction location.

3. A bending force receiver as claimed in claim 1 wherein the casing comprises an opening in its side adjacent the force introduction location for the free passage therethrough of the cantilever arm, the edge of said opening serving as the overload abutment.

4. A bending force receiver as claimed in claim 1 wherein the main bearing is a diaphragm which is tightly connected to the inner wall of the casing and which encloses the bending rod tightly.

5. A bending force receiver as claimed in claim 1 wherein the main bearing is a knife edge bearing and the cantilever arm is sealed in the vicinity of the knife edge bearing from the portion of the casing which surrounded the strain gauge strips by means of a flexible corrugated bellows.

6. A bending force receiver as claimed in claim 1, wherein the cantilever arm has a smaller cross-section than the portion the bending rod in the region supporting the strain gauge strips.

7. A bending force receiver as claimed in claim 1, wherein the force introduction location is displaceable.

8. A bending force receiver as claimed in claim 1 which comprises a plurality of force introduction locations.

9. A bending force receiver as claimed in claim 1 wherein the restraining means comprises a steel band or a swing support which permits minor axial displacement of the bending rod.

* * * * *